United States Patent
Suzuki et al.

(10) Patent No.: US 7,470,302 B2
(45) Date of Patent: Dec. 30, 2008

(54) HONEYCOMB STRUCTURE

(75) Inventors: Kyoko Suzuki, Nagoya (JP); Keiji Matsumoto, Nagoya (JP); Hiroyuki Suenobu, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 473 days.

(21) Appl. No.: 10/547,509

(22) PCT Filed: Mar. 4, 2004

(86) PCT No.: PCT/JP2004/002717

§ 371 (c)(1),
(2), (4) Date: Aug. 31, 2005

(87) PCT Pub. No.: WO2004/087295

PCT Pub. Date: Oct. 14, 2004

(65) Prior Publication Data

US 2006/0193756 A1    Aug. 31, 2006

(30) Foreign Application Priority Data

Mar. 28, 2003  (JP) .............................. 2003-090178
Feb. 2, 2004  (JP) .............................. 2004-025767

(51) Int. Cl.
*B01D 46/00* (2006.01)
*F01N 3/022* (2006.01)

(52) U.S. Cl. .................. 55/523; 55/282.2; 55/282.3; 55/385.3; 55/524; 55/DIG. 5; 55/DIG. 10; 55/DIG. 30; 95/273; 60/297; 60/299; 60/311; 422/180; 502/439; 428/116; 264/628; 264/631; 264/DIG. 48

(58) Field of Classification Search ............. 55/282.2, 55/282.3, 385.3, 523, 524, DIG. 5, DIG. 10, 55/DIG. 30; 60/295, 297, 299, 301, 311; 422/177, 180; 502/439; 428/116, 117, 118; 264/40, 44, 628, 630, 631, DIG. 48; 95/273
See application file for complete search history.

(56) References Cited

U.S. PATENT DOCUMENTS

| | | | | |
|---|---|---|---|---|
| 4,772,580 A | * | 9/1988 | Hamanaka et al. | 502/439 |
| 4,956,329 A | * | 9/1990 | Chao et al. | 502/439 |
| 5,030,398 A | * | 7/1991 | Hamanaka et al. | 264/631 |
| 5,123,243 A | * | 6/1992 | Baddour | 60/311 |
| 5,549,725 A | * | 8/1996 | Kasai et al. | 55/523 |
| 5,634,952 A | * | 6/1997 | Kasai et al. | 55/523 |
| 5,997,984 A | * | 12/1999 | Koike et al. | 428/116 |
| 6,291,379 B1 | * | 9/2001 | Noguchi et al. | 264/631 |
| 6,432,856 B1 | * | 8/2002 | Beall et al. | 428/116 |

(Continued)

FOREIGN PATENT DOCUMENTS

JP    A 7-039761    2/1995

(Continued)

*Primary Examiner*—Jason M Greene
(74) *Attorney, Agent, or Firm*—Oliff & Berridge, PLC

(57) ABSTRACT

There is provided a honeycomb structure 1 including porous partition walls 2 disposed so as to form a plurality of through holes 3a, 3b extending from one end portion to the other end portion in A-axis direction, and containing cordierite as a main component. When porosity is P (%), compressive strength in the A-axis direction is C(MPa), and open frontal area is A (%); a relation of $C \geq (600e^{-0.0014AP})+0.5$ is satisfied. The honeycomb structure has small pressure loss, is hardly damaged, and has excellent trapping efficiency.

26 Claims, 3 Drawing Sheets

U.S. PATENT DOCUMENTS

| | | | |
|---|---|---|---|
| 6,773,481 B2 * | 8/2004 | Noguchi et al. | 55/523 |
| 6,803,086 B2 * | 10/2004 | Noguchi et al. | 428/116 |
| 7,122,237 B2 | 10/2006 | Hamanaka et al. | |
| 7,179,316 B2 * | 2/2007 | Merkel et al. | 55/523 |
| 2003/0151155 A1 * | 8/2003 | Muroi et al. | 264/44 |

FOREIGN PATENT DOCUMENTS

| | | |
|---|---|---|
| JP | A 7-163822 | 6/1995 |
| JP | A 9-77573 | 3/1997 |
| JP | A 2002-191985 | 7/2002 |
| JP | A 2002-326879 | 11/2002 |
| JP | A 2002-357114 | 12/2002 |
| WO | WO 02/41971 A1 | 5/2002 |
| WO | WO 02/41972 A1 | 5/2002 |

* cited by examiner

HONEYCOMB STRUCTURE

TECHNICAL FIELD

The present invention relates to a honeycomb structure. Particularly, the present invention relates to a honeycomb structure which can suitably be employed as a filter for purifying exhaust gas or as a catalyst carrier.

BACKGROUND OF THE INVENTION

There has recently been highlightened on a large scale an influence of particulate matter emitted from a diesel engine or the like or $NO_x$ upon environment. As an important means to remove such harmful matter, various studies are made with regard to usage of a honeycomb structure having porous partition walls as a filter, catalyst carrier, or the like.

For example, there has been developed a honeycomb structure for a filter for trapping particulate matter (hereinbelow referred to as PM) emitted from a diesel engine (the filter is hereinbelow referred to as DPF). A honeycomb structure for a DPF generally has porous partition walls disposed so as to form a plurality of through holes extending in an axial direction, and adjacent through holes are plugged at the opposite end portion. Exhaust gas is sent in the through holes opening at one end portion and passed through the partition walls inside the honeycomb structure, and thereby particulate matter in the exhaust gas can be trapped and removed.

Such a honeycomb structure is generally subjected to canning with metal when it is mounted on a car body and used in this state. Therefore, when the honeycomb structure has low isostatic strength, the honeycomb structure is sometimes damaged upon canning or during use in a condition that it is canned. Therefore, upon canning of the honeycomb structure, the honeycomb structure is required to have an isostatic strength of about 1MPa or more. On the other hand, when a honeycomb structure is used as a DPF, a catalyst carrier, or the like, pressure loss of exhaust gas becomes a problem. That is, pressure loss of exhaust gas is caused because exhaust gas passes through a honeycomb structure, which leads to decrease in output or increase in fuel consumption of an internal combustion engine such as a diesel engine or a gasoline engine. With regard to this, it is effective to raise porosity or open frontal area of a honeycomb structure so as to decrease pressure loss. However, raising porosity or open frontal area of a honeycomb structure generally causes deterioration in isostatic strength of the honeycomb structure, and the honeycomb structure is prone to be damaged. Therefore, there has been desired a honeycomb structure which has high isostatic strength and is hardly damaged even if porosity or open frontal area of the honeycomb structure is raised so as to decrease pressure loss.

There is disclosed a honeycomb structure containing cordierite as the main component and having a thermal expansion coefficient of $3 \times 10^{-6}$ or less, a porosity of 55 to 80%, and an average pore diameter of 25 to 40 μm for the purpose of providing a honeycomb structure having characteristics of high trapping, small pressure loss, and low thermal expansion coefficient (JP-A-9-77573). In addition, there is disclosed a honeycomb structure having a porosity of 55 to 80%, an average pore diameter of 30 to 50 μm, and $Y/X \leq 0.05$ (X represents capacity of the whole pores, and Y represents capacity of the pores each having a diameter of 100 μm or more.) for the purpose of providing an exhaust gas purification filter which is inhibited from being damaged or melted and which has excellent ability to remove particulate matter (JP-A-2002-357114). However, there has not been obtained a honeycomb structure which has small pressure loss and which is hardly damaged.

DISCLOSURE OF THE INVENTION

The present invention has been made in view of such a situation and aims to provide a honeycomb structure which is hardly damaged even with high porosity or open frontal area and a production method thereof.

According to the first aspect of the present invention, there is provided a honeycomb structure comprising porous partition walls disposed so as to form a plurality of through holes extending from one end portion to the other end portion in A-axis direction, and containing cordierite as a main component;

wherein, when porosity is P (%), compressive strength in the A-axis direction is C(MPa), and open frontal area is A (%), a relation of Z1=0.5, preferably Z1=1.0, and more preferably 1.5 in the following formula (1):

$$C \geq (600e^{-0.0014AP}) + Z1 \quad (1)$$

is satisfied.

In the first aspect of the present invention, it is preferable that predetermined through holes among the plurality of through holes are plugged at one of the end portions. In addition, it is preferable that an average pore diameter is 15 μm or more and less than 30 μm. A volume ratio of pores having pore diameters of 10 to 40 μm to all pores is preferably 50% or more, and more preferably 70% or more. It is preferable that a volume ratio of pores having pore diameters of 70 μm or more to all pores is 10% or less. In addition, a volume ratio of pores having pore diameters of 10 μm or less to all pores is preferably 30% or less and more preferably 10% or less. The porosity is preferably 55% or more, and pre preferably 60 to 70%. In addition, a thermal expansion coefficient of partition walls in B-axis direction of the honeycomb structure is preferably $1.0 \times 10^{-6}/°C$. or less. The partition wall preferably has a thickness of 290 to 310 μm, and 270 to 330 through holes are preferably present per one square inch (6.4516 $cm^2$) in a section perpendicular to the A-axis direction, and the P (%) and the C(MPa) satisfy a relation of preferably Z2=0.5, more preferably Z2=1.0, and particularly preferably Z2=1.5 in the following formula (2):

$$C \geq (600e^{-0.088P}) + Z2 \quad (2).$$

There is also provided a method for producing a honeycomb structure satisfying a relation of Z1=0.5, preferably Z1=1.0, and more preferably Z1=1.5 in the following formula (1):

$$C \geq (600e^{-0.0014AP}) + Z1 \quad (1)$$

wherein P is a porosity (%), C is a compressive strength (MPa) in the A-axis direction, and A is an open frontal area (%);

the method comprising:
a forming step where a raw material comprising a cordierite-forming raw material, a pore-forming material, and water is kneaded and formed to obtain a honeycomb formed body having partition walls disposed so as to form a plurality of through holes extending from one end portion to the other end portion in A-axis direction, and
a firing step where the honeycomb formed body is fired.

According to the second aspect of the present invention, there is provided a method for producing a honeycomb structure comprising:

a forming step where a raw material comprising a cordierite-forming raw material, a pore-forming material, and water is kneaded and formed to obtain a honeycomb formed body having partition walls disposed so as to form a plurality of through holes extending from one end portion to the other end portion in A-axis direction, and a firing step where the honeycomb formed body is fired;

wherein the cordierite-forming raw material contains an aluminum source raw material, kaolin, talc, and silica, with the aluminum source raw material having an average particle diameter of 1 to 6 µm, kaolin having an average particle diameter of 1 to 10 µm, and talc and silica each having an average particle diameter of 10 to 60 µm. In the second aspect of the present invention, it is preferable that the aluminum source raw material has an average particle diameter of 1 to 4 µm, kaolin has an average particle diameter of 1 to 6 µm, and talc and silica each has an average particle diameter of 10 to 30 µm. It is more preferable that the aluminum source raw material has an average particle diameter of 1 to 2 µm, kaolin has an average particle diameter of 1 to 3 µm, and talc and silica each has an average particle diameter of 10 to 30 µm.

In a production method of the present invention, it is preferable that the method includes a plugging step where predetermined through holes are plugged at one of the end portion, that the pore-forming material contains a resin which foams by heating, that the pore-forming material contains a foamed resin, and that the pore-forming material contains graphite.

A honeycomb structure according to the first aspect of the present invention is hardly damaged even with high porosity or open frontal area and can suitable be used as an exhaust gas purification filter such as a DPF, a catalyst carrier, etc. In addition, according to a method for producing a honeycomb structure as the second aspect of the present invention, a honeycomb structure as the first aspect of the present invention can suitably be produced.

BEST MODE FOR CARRYING OUT THE INVENTION

Examples

Figure 1A:
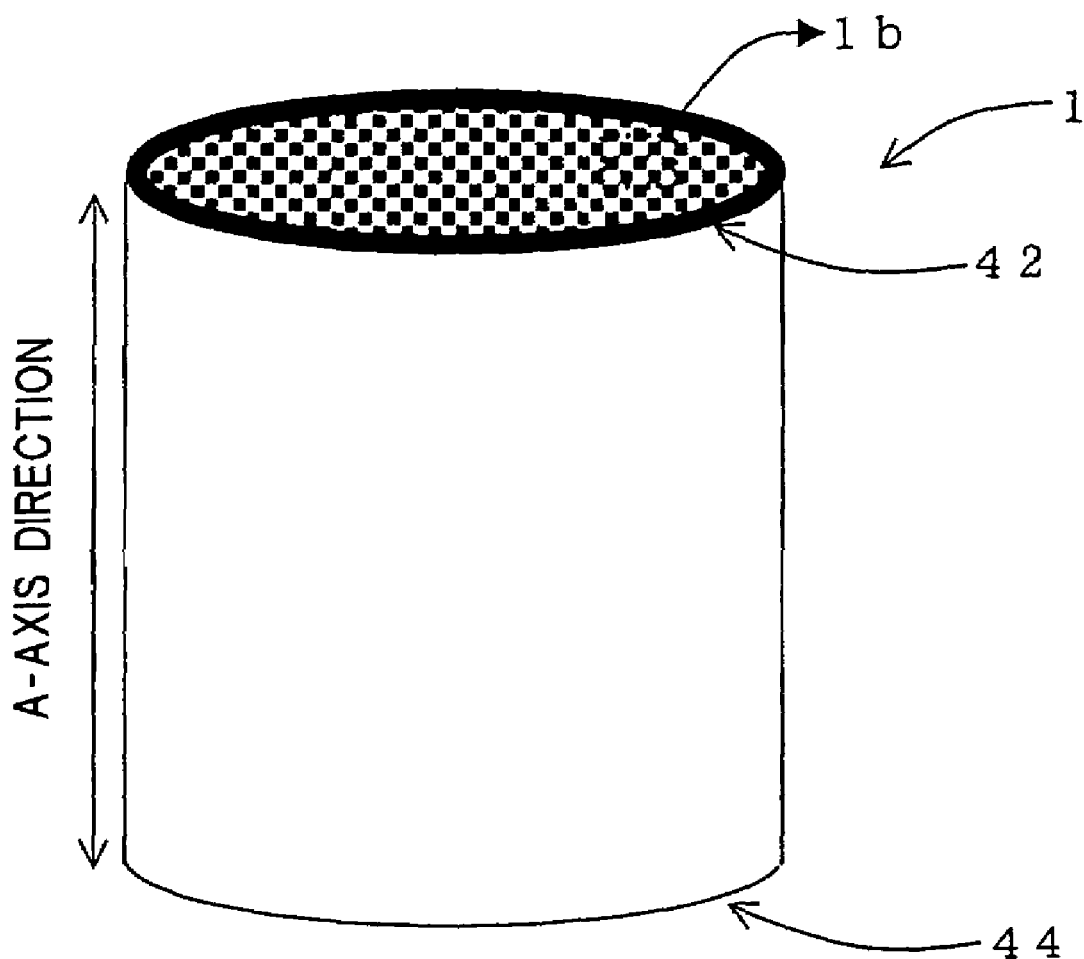
FIG. 1(a) is a perspective view schematically showing an embodiment of a honeycomb structure of the present invention.

A honeycomb structure as the first aspect of the present invention and a production method thereof and a method for producing a honeycomb structure as the second aspect of the present invention and a honeycomb structure obtained by the method will hereinbelow be described in detail on the basis of specific embodiments. However, the present invention is by no means limited to the following embodiments. Incidentally, a "cross section" means a section perpendicular to a longitudinal direction (e.g., A-axis direction in FIG. 1(a)) of through holes as long as a particular comment is not made.

A honeycomb structure 1 of the first aspect of the present invention contains cordierite as the main component and is provided with porous partition walls 2 disposed so as to form a plurality of through holes 3a and 3b extending from one end portion (end portion 42) to the other end portion (end portion 44) in A-axis direction.

The important characteristic of the first aspect of the present invention is that, when porosity is P (%), compressive strength in the A-axis direction is C(MPa), and open frontal area is A (%), a relation of Z1=0.5, preferably Z1=1.0, and more preferably Z1=1.5 in the following formula (1):

$$C \geq (600e^{-0.0014AP}) + Z1 \tag{1}$$

is satisfied. Since strength is lowered when porosity and open frontal area are raised so as to decrease pressure loss in a conventional honeycomb structure containing cordierite as the main component, the relation among P (%), C(MPa) and A (%) was C(MPa) is about 1.4 (MPa) when P (%) is about 69.5(b), and C(MPa) is about 3.5 (MPa) when P (%) is about 60.3(%) in, for example, a honeycomb structure having an open frontal area A (%) of 62.8(%). Such data were collected with respect to a conventional honeycomb structure, and it was found that P (%) and C(MPa) had a relation of an approximate curve shown by the following formula (3):

$$C = 600e^{-0.088P} \tag{3}$$

when an open frontal area is about 62.8%. In addition, when a porosity is about 33%, a relation of open frontal area A (%) and compressive strength C(MPa) in A-axis direction had a relation of an approximate curve shown by the following formula (4):

$$C = 600e^{-0.0462A} \tag{4}$$

Therefore, P (%), C(MPa) and A (%) in a conventional honeycomb structure had a relation shown by the following formula (5)

$$C = 600e^{-0.0014AP} \tag{5}$$

which was obtained by combining the above formulae (3) and (4).

As a result of the inventors' study to improve compressive strength in A-axis direction, the inventors found out that by using a raw material having a specific average diameter as a cordierite-forming material, the relation among P (%), A (%), and C(MPa) satisfies the relation of Z1=0 in the following formula (1):

$$C \geq (600e^{-0.0014AP}) + Z1 \tag{1}$$

Figure 2:
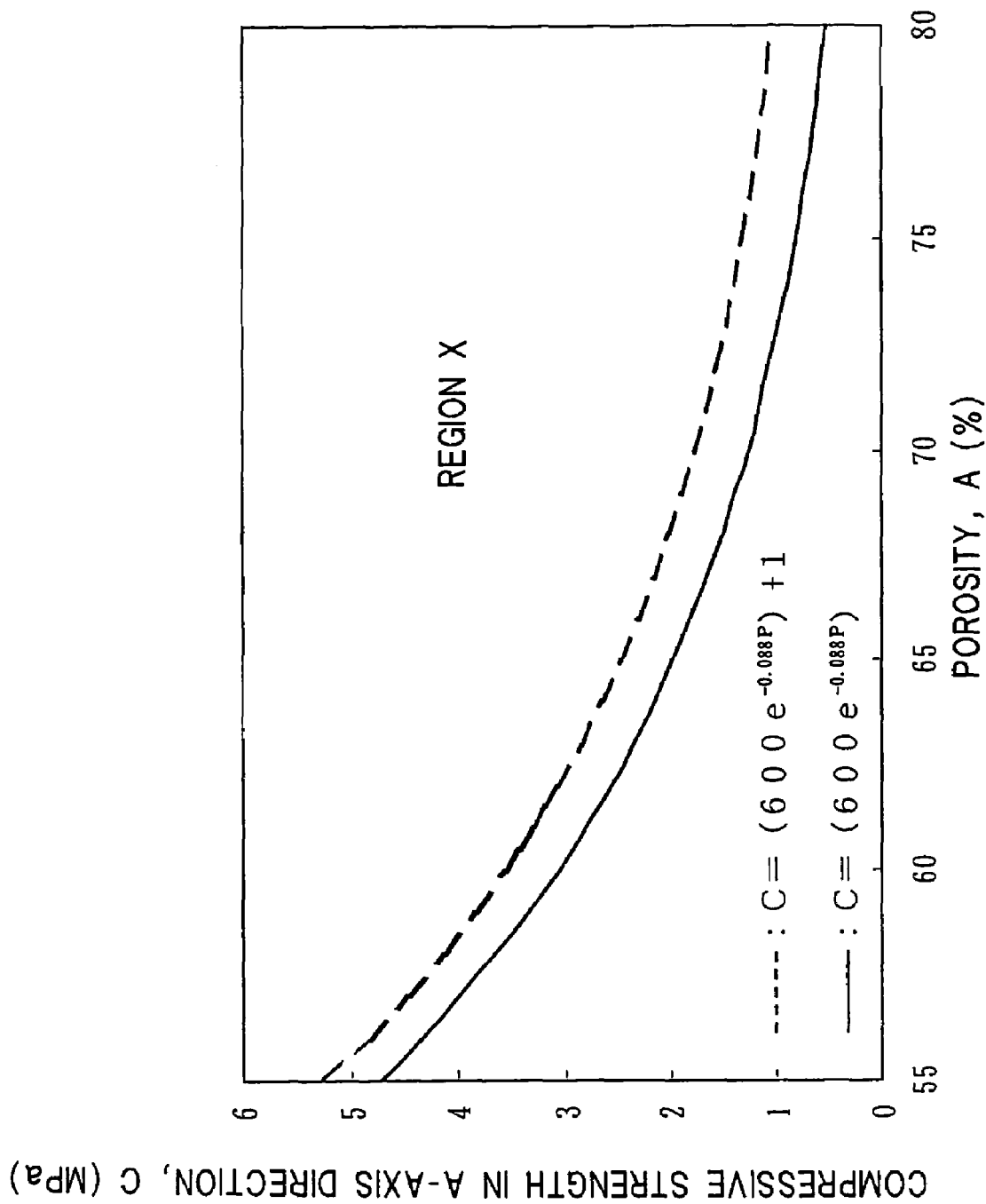
FIG. 2 is a view showing a relation between compressive strength in A-axis direction and porosity.

That is, the inventors found that there can be obtained a honeycomb structure having a relation where C(MPa) with the same porosity is shifted to 0.5 MPa larger than a relation shown by the following formula (3):

$$C = 600e^{-0.088P} \tag{3}$$

in, for example, a honeycomb structure having an open frontal area of about 62.8%, and they succeeded in obtaining a honeycomb structure which has small pressure loss and is hardly damaged. That is, in a honeycomb structure as the first aspect of the present invention, the relation of P (%) and C(MPa) is in the region X shown in FIG. 2, that is, the relation of Z2=0.5 in the following formula (2):

$$C \geq (600e^{-0.088P}) + Z2 \tag{2}$$

is satisfied. When the following formula (4)

$$C = 600e^{-0.0462A} \tag{4}$$

of open frontal area and compressive strength in A-axis direction is combined to the formula (2), the relation of Z1=0.5 is given in the following formula (1):

$$C \geq (600e^{-0.0014AP}) + Z1 \tag{1}$$

The present inventors succeeded in obtaining a honeycomb structure satisfying this relation. Then, they found out that there is a substantially proportional relation between compressive strength in A-axis direction and isostatic strength and succeeded in obtaining a honeycomb structure having high isostatic strength even with high porosity and/or high open frontal area and being hardly damaged, for example, even upon canning of the honeycomb structure. In the first aspect of the present invention, in order to enhance isostatic strength, Z1=0.5 in the formula (1) is necessary, and Z1=1.0 is preferable in order to obtaining sufficient safety for inhibiting damages upon canning. Further, Z1=1.5 is preferable in order to planning to raise porosity of a honeycomb structure with maintaining sufficient safety for inhibiting damages upon canning.

Figure 3:
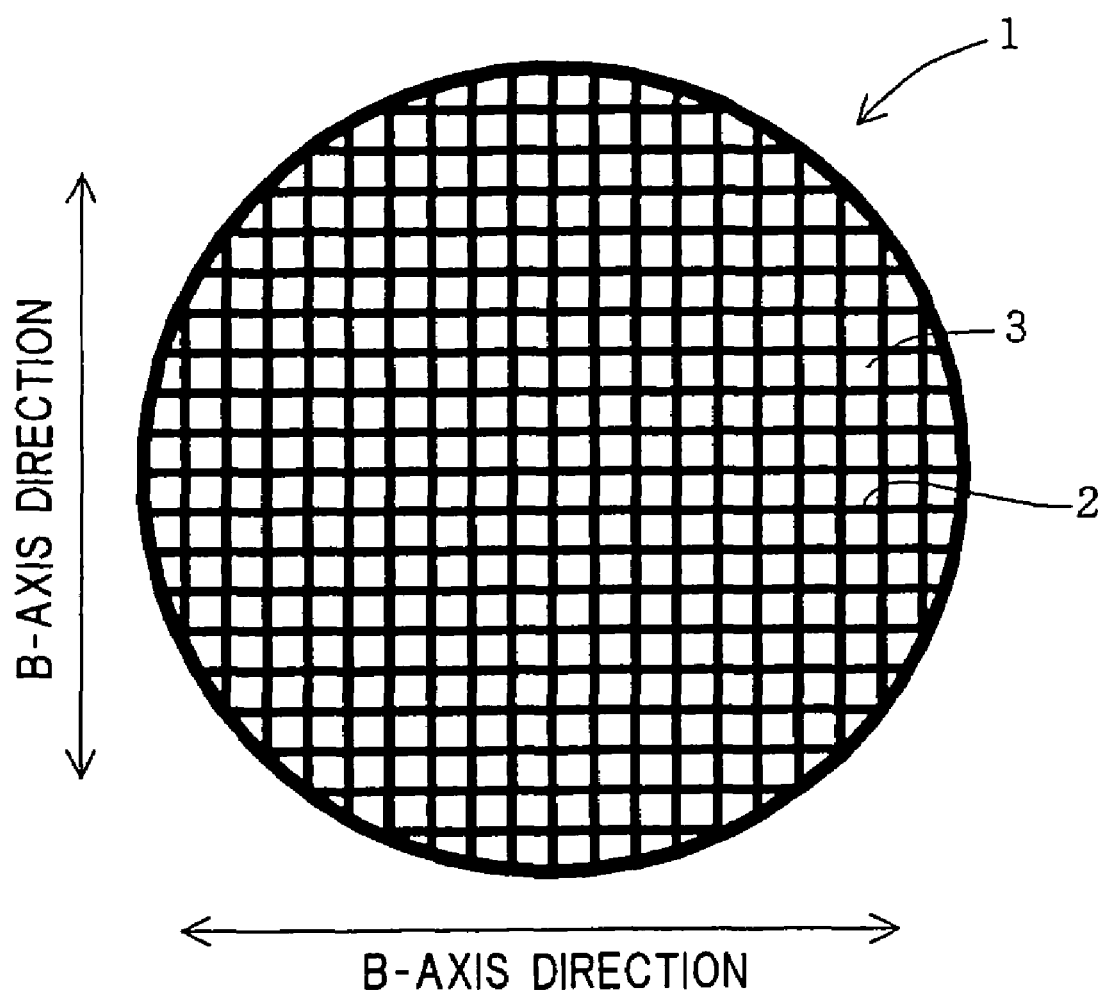
FIG. 3 is a sectional view schematically showing an embodiment of a honeycomb structure of the present invention.

In the present invention, "porosity" means volume ratio of pores containing in partition walls to partition walls, "A-axis direction" means a longitudinal direction of through holes as shown in FIG. 1(a), and "compressive strength" in A-axis direction means compressive strength measured by a method according to JASO standard M505-87. "Open frontal area" means rate of the area of the through holes 3 with respect to the total area of the through holes 3 and the partition walls 2 in a section in a honeycomb structure 1 shown in FIG. 3.

Figure 1B:
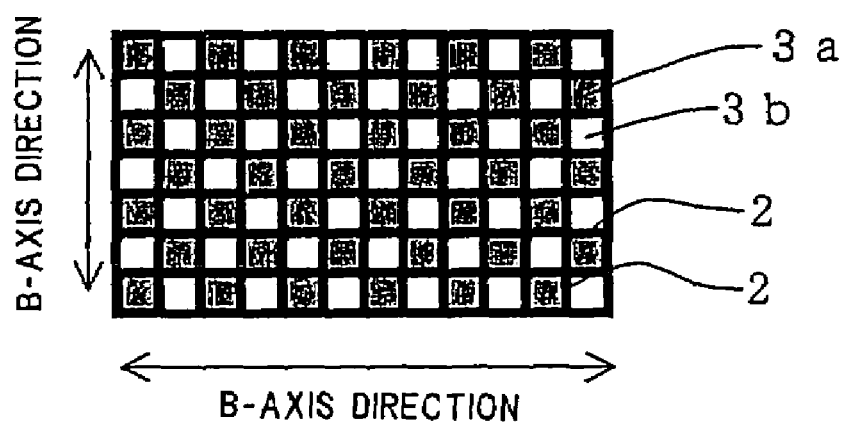
FIG. 1(b) is a partially enlarged plan view of the 1b portion of the FIG. 1(a).

In the case of using a honeycomb filter of the first aspect as a filter such as a DPF, there is employed an embodiment where each of the predetermined through holes 3a and 3b plugged at one of the end portions, i.e., one of the end portions 42 and 44 as shown in FIGS. 1(a) and 1(b). In this case, it is preferable that adjacent through holes 3 with a partition wall between are plugged at mutually opposite end portion in such a manner that each of the end portions 42 and 44 forms a checkerboard pattern. Incidentally, all the though holes are not necessarily plugged in a filter such as a DPF in the case that much importance is attached to pressure loss, while it is preferable that all the though holes are plugged in one of the end portions in the case that much importance is attached to trapping efficiency. There is some cases where plugging is not required, for example, in the case of using a honeycomb structure as a catalyst carrier. Therefore, plugging is not essential in the present invention.

When a honeycomb structure of the first aspect is used as a filter such as a DPF, it is preferable that the honeycomb structure has an average pore diameter of 15 μm or more, and less than 30 μm for small pressure loss and high trapping efficiency. The present inventors made an experiment on PM trapping with respect to an average pore diameter and trapping efficiency and found out that small pressure loss and high trapping effect can be obtained with an average pore diameter in the above range. This is because when an average pore diameter is too small, pressure loss becomes too large, when it is too large, too much PM passes through partition walls. Here, trapping efficiency means an amount of PM trapped in a honeycomb structure with respect to an amount of PM introduced in a honeycomb structure.

Further, a volume ratio of pores having pore diameters of 10 to 40 μm to all pores is preferably 50% or more, and more preferably 70% or more. When too many pores having small pore diameters are present, too many pores are sealed and cause increase in pressure loss, for example, in the case of loading a catalyst on the honeycomb structure. When too many pores having large diameters are present, too much PM passes through partition walls, and trapping efficiency is lowered. From similar reasons, it is preferable that a volume ratio of pores having pore diameters of 70 μm or more is 10% or less. Further, from similar reasons, a volume ratio of pores having pore diameters of 10 μm or less is preferably 30% or less, and more preferably 10% or less.

In a honeycomb structure of the first aspect, porosity is preferably 55% or more from the viewpoint of decrease in pressure loss, and more preferably 60% or more from the viewpoint of further decrease in pressure loss. Particularly, in the first aspect of the present invention, porosity is preferably 60% or more also in that sufficient strength can be obtained even if porosity is raised. On the other hand, in usage where much importance is attached to strength, it is not preferable to extremely raise the porosity, and porosity of 70% or less is preferable.

In the first aspect, it is preferable that a thermal expansion coefficient of partition walls in a longitudinal direction (B-axis direction) in a section of the honeycomb structure is $1.0 \times 10^{-6}/°C$ or less from the view point of inhibiting generation of thermal stress and damages due to the thermal stress. Here, a thermal expansion coefficient means a thermal expansion coefficient at 40 to 800° C.

Thickness of partition walls is not particularly limited in the present invention. However, when the partition walls 2 are too thick, it may cause deterioration in treating ability for treating fluid or increase in pressure loss; while, when the partition walls 2 are too thin, strength is insufficient as a honeycomb structure. Neither of them is preferable. The partition walls 2 have a thickness of preferably 100 to 1000 μm, more preferably 150 to 750 μm, and particularly preferably 200 to 500 μm.

In addition, the number of through holes per one square inch (6.4516 cm$^2$) (cell density) in a section of a honeycomb structure is not particularly limited. However, when the cell density is too low, strength as a honeycomb structure or the effective filtration area in use as a filter is insufficient. When the cell density is too high, pressure loss is too large when fluid to be treated flows in the honeycomb structure. Therefore, cell density of the honeycomb structure is preferably 50 to 100 cells/inch$^2$ (7.75 to 155 cells/cm$^2$), more preferably 75 to 500 cells/inch$^2$ (11.6 to 77.5 cells/cm$^2$), and particularly preferably 100 to 400 cells/inch$^2$ (15.5 to 62.0 cells/cm$^2$). Though a sectional shape of a through hole is not particularly limited, it is preferably one of a triangle, rectangle, hexagon, and corrugation.

One of preferable embodiments of a honeycomb structure of the first aspect of the present invention is an embodiment where the honeycomb structure has a thickness of partition walls of 290 to 310 μm, a cell density of 270 to 330/inch$^2$, and compressive strength C(MPa) in the A-axis direction and porosity P (%) satisfy a relation of Z2=0.5 in the following formula (2):

$$C \geq (600e^{-0.088P}) + Z2 \qquad (2)$$

Such an embodiment can give high isostatic strength and inhibit a honeycomb structure from being damaged upon canning. Further, an embodiment which satisfies Z2=1.0 is preferable for obtaining sufficient safety for inhibiting damages upon canning. Further, an embodiment which satisfies Z1=1.5 is particularly preferable in order to plan to impart high porosity to a honeycomb structure having small pressure loss and being hardly damaged with maintaining sufficient safety for inhibiting damages upon canning.

The main component of a honeycomb structure in the present invention is cordierite. That is, it is necessary that cordierite is included by 50 mass % or more of the honeycomb structure, preferably 70 mass % ore more, and particularly preferably 90 mass % or more. There is no particular limitation to a sectional shape of a honeycomb structure of the present invention, and any shape, for example, a circle, ellipse, oval, rough triangle, or rough rectangle.

It is preferable to load a catalyst, e.g., a metal having catalytic function on a honeycomb structure of the present invention. For example, when a honeycomb structure is used as a DPF, it is preferable to load a catalyst for lowering combustion-initiation temperature. Examples of the metal having catalytic function include Pt, Pd, Rh, and it is preferable to load at least one of them on a honeycomb structure.

Next, a method of producing a honeycomb structure of the first aspect of the present invention will be described. First, a raw material containing a cordierite-forming raw material, a pore-forming material, and water is kneaded to obtain clay. The clay is subjected to extrusion to obtain a honeycomb-shaped formed body in a forming step. Next, each of predetermined through holes is plugged at one end with, for example, a slurry containing a cordierite-forming raw material, a binder, a dispersant, and water as necessary. After the plugged or not plugged formed body is dried, the formed body is fired at a predetermined temperature in a firing step. Thus, a honeycomb structure can be obtained.

Here, a cordierite-forming raw material means cordierite or a raw material which forms cordierite by firing. Examples of the raw material which forms cordierite include aluminum source components such as a mixture of aluminum oxide and/or aluminum hydroxide, kaolin, talc, quarts, fused silica, mullite, and magnesite, and preferable a mixture of these raw materials so as to give a theoretical composition of a cordierite crystal.

Next, a method for producing a honeycomb structure as the second aspect of the present invention is concretely described. A production process of the second aspect includes the aforementioned forming step and firing step. An important characteristic of the second aspect of the present invention is that the method employs the cordierite-forming raw material containing an aluminum source raw material, kaolin, talc, and silica, with the aluminum source raw material having an average particle diameter of 1 to 6 µm, kaolin having an average particle diameter of 1 to 10 µm, and talc and silica each having an average particle diameter of 10 to 60 µm.

By using a raw material having such a composition and having components each having a particle diameter in such a range, there can suitably be produced a honeycomb structure which satisfies a relation of $Z1=0.5$ in the formula (1) in the first aspect of the present invention. That is, there can be produced a honeycomb structure having higher porosity and compressive strength in A-axis direction. Further, by giving the limitations of the aluminum source raw material having an average particle diameter of 1 to 4 µm, kaolin having an average particle diameter of 1 to 6 µm, and talc and silica each having an average particle diameter of 10 to 30 µm, there can be produced a honeycomb structure which satisfies a relation of $Z1=1.0$ in the formula (1); and by giving the limitations of the aluminum source raw material having an average particle diameter of 1 to 2 µm, kaolin having an average particle diameter of 1 to 3 µm, and talc and silica each having an average particle diameter of 10 to 30 µm, there can be produced a honeycomb structure which satisfies a relation of $Z1=1.5$ in the formula (1). In addition, pore diameter and distribution of pore diameter can also be controlled in preferable ranges in the first aspect.

It has conventionally been general that raw materials having larger particle diameters are used as an aluminum source raw material such as aluminum oxide and/or aluminum hydroxide and kaolin. By using such raw materials with smaller particle diameters and combining with talc and silica with relatively large particle diameters, there can be obtained a honeycomb structure having higher compressive strength in A-axis direction and higher isostatic strength with the conventional open frontal area and porosity in comparison with the conventional honeycomb structure.

Here, an aluminum source material means aluminum oxide and/or aluminum hydroxide. When only aluminum oxide or aluminum hydroxide is used, each particle diameter is in the above range. When both of them are used, particle diameters of both are in the above range. There may be used an aluminum raw material prepared by mixing two aluminum source raw materials having two different average particle diameters so that the mixture has an average particle diameter within the above range. Also, with respect to kaolin, there may be used kaolin prepared by mixing two types of kaolin having two different average particle diameters so that the mixture has an average particle diameter within the above range. Also, with respect to talc and silica, there may be used talc or silica prepared by mixing two types of talc or silica having two different average particle diameters so that the mixture has an average particle diameter within the above range.

Examples of the pore-forming material include graphite, a foaming resin, flour, starch, a phenol resin, polymethylmethacrylate, polyethylene, and poly(ethylene terephthalate). Among them, it is preferable that a foaming resin is contained. The foaming resin includes a resin which foams by heating and an already foamed resin. It is preferable that the foaming resin which foams by heating is contained as the pore forming material in that a large number of open pores can be made from the viewpoint of improving performance as a filter. It is more preferable to use a foaming resin which foams at 100° C. by heating in that a large number of open pores can be made and that deformation of the structure can be suppressed. It is preferable to contain an already foamed resin from the view point of suppressing damages (so-called cell crack).

In addition to the aforementioned raw materials, it is preferable to further add a binder and/or a dispersant. Examples of the binder include hydroxypropylmethylcellulose, methyl cellulose, hydroxyethyl cellulose, carboxymethylcellulose, and poly(vinyl alcohol). Examples of the dispersant include ethylene glycol, dextrin, fatty acid soap, and polyalcohol.

Clay can be prepared by blending 5 to 40 parts by mass of a pore-forming material, 10 to 40 parts by mass of a dispersion medium, and, as necessary, 3 to 5 parts by mass of a binder and 0.5 to 2 parts by mass of a dispersant with respect to 100% by mass of a raw material as the main component, and kneading the mixture. As a kneading and preparation apparatus, a combination of a kneader and an extruder, or a continuous kneading extruder may be used.

Examples of the drying method of the formed body include hot air drying, dielectric drying, drying under reduced pressure, vacuum drying, and freeze drying. Firing is preferably conducted at 1400 to 1440° C. generally in an ambient atmosphere.

In the second aspect of the present invention, it is preferable to include a plugging step for plugging a predetermined through holes. The plugging step is conducted by adding water, a binder, etc., to a predetermined raw material, for example, a cordierite-forming raw material to make the material in the form of slurry, disposing the slurry so as to plug opening end portions of predetermined through holes, and drying and/or firing the slurry. It is preferable that adjacent through holes with a partition walls between are plugged at mutually opposite end portions so that each end portion of the honeycomb structure forms a checkerboard pattern. Plugging may be conducted at any stage as long as it is after the forming step. However, when plugging requires firing, plugging is preferably conducted before the firing step because only one time of firing is required.

The present invention will hereinbelow be described in more detail on the basis of Examples. However, the present invention is by no means limited to these Examples.

EXAMPLES 1 to 11 AND COMPARATIVE EXAMPLES 1 to 3

As a cordierite-forming raw material, there were used aluminum oxide (alumina), aluminum hydroxide, kaolin, talc, and fused silica each having the average particle diameter shown in Table 1. Graphite as a pore-forming material, foamed resin (foaming resin), and resin which foams by heating (unfoamed foaming resin) were added to these at a compounding ratio shown in Table 2. Further, a water-soluble cellulose derivative, a surfactant, and water were added to them. The mixture was kneaded and extruded to form a honeycomb formed body, which was then dried. Plugging was conducted with a slurry prepared by mixing a cordierite-forming material, a binder, and a dispersant in such a manner that each end portion formed a checkerboard pattern. The formed body was dried again and fired at 1425° C. to obtain a honeycomb structure having a thickness of partition walls, a cell density, and an open frontal area shown in Table 3 and a rectangular cell shape.

(Measurement for Porosity)

Volume of the whole pores was obtained by a method of mercury penetration to calculate porosity. True density of the cordierite was set to be 2.52 g/cm³. Average particle diameter was set to be a value of the median pore diameter at a volume standard.

(Measurement for A-Axial Compressive Strength)

A columnar test piece having an A-axial length of 25.4 mm and a diameter of 25.4 mm, which is perpendicular to the A-axis was taken out of the honeycomb structure. Compressive strength in A-axis direction was measured by an autograph. Load cell was set to be 25 kN, and loading speed was 0.5 mm/min.

(Measurement for Thermal Expansion Coefficient)

A longitudinal direction of through holes of the honeycomb structure (e.g., A-axis direction of FIG. 1(a)) was defined as A-axis direction, and a longitudinal direction of partition walls in a section of the honeycomb structure (e.g., B-axis direction of FIG. 1(b)) was defined as B-axis direction. Linear thermal expansion coefficient at 40 between 800° C. was measured in each of the directions.

TABLE 1

| | Average particle diameter (μm) | | | | | | | |
| --- | --- | --- | --- | --- | --- | --- | --- | --- |
| | Alumina | Aluminum hydroxide | Kaolin | Talc | Fused silica | Graphite | Foamed resin | Unfoamed foaming resin |
| Example 1 | 4 | 2 | 4 | 25 | 50 | 40 | 50 | |
| Example 2 | 4 | 2 | 8 | 25 | 25 | | 50 | |
| Example 3 | 4 | 2 | 4 | 25 | 25 | | 20 | 15 |
| Example 4 | 4 | 2 | 6 | 25 | 12 | | 50 | 15 |
| Example 5 | 2 | 2 | 6 | 25 | 25 | | 50 | 15 |
| Example 6 | 2 | 2 | 6 | 25 | 25 | | 50 | 15 |
| Example 7 | 2 | 2 | 4 | 12 | 25 | | 40 | 15 |
| Example 8 | 2 | 1 | 2 | 25 | 12 | | 40 | |
| Example 9 | 4 | 2 | 6 | 25 | 25 | | 50 | |
| Example 10 | 4 | 2 | 6 | 25 | 25 | 20 | 50 | |
| Example 11 | 2 | 2 | 10 | 25 | 40 | | 40 | |
| Comp. Ex. 1 | 6 | 2 | 6 | 25 | 25 | 40 | 50 | |
| Comp. Ex. 2 | 4 | 2 | 6 | 25 | 100 | | 50 | |
| Comp. Ex. 3 | 6 | 2 | 10 | 25 | 50 | | 50 | |

TABLE 2

| | Compounding ratio (parts by mass) | | | | | | | |
| --- | --- | --- | --- | --- | --- | --- | --- | --- |
| | Alumina | Aluminum hydroxide | Kaolin | Talc | Fused silica | Graphite | Foamed resin | Unfoamed foaming resin |
| Example 1 | 14 | 15 | 19 | 40 | 12 | 10 | 1.7 | |
| Example 2 | 14 | 15 | 19 | 40 | 12 | | 2 | |
| Example 3 | 14 | 15 | 19 | 40 | 12 | | 3.6 | 2 |
| Example 4 | 14 | 15 | 19 | 40 | 12 | | 1.8 | 2 |
| Example 5 | 14 | 15 | 19 | 40 | 12 | | 1.7 | 2 |
| Example 6 | 19.5 | 7.8 | 19 | 40 | 12 | | 1.8 | 2 |
| Example 7 | 14 | 15 | 19 | 40 | 12 | | 1.8 | 2.5 |
| Example 8 | 14 | 15 | 19 | 40 | 12 | | 2 | |
| Example 9 | 14 | 15 | 19 | 40 | 12 | | 1.5 | |
| Example 10 | 14 | 15 | 19 | 40 | 12 | 10 | 1.5 | |
| Example 11 | 14 | 15 | 19 | 40 | 12 | | 1.7 | |
| Comp. Ex. 1 | 14 | 15 | 19 | 40 | 12 | 10 | 1.5 | |
| Comp. Ex. 2 | 14 | 15 | 19 | 40 | 12 | | 1.6 | |
| Comp. Ex. 3 | 14 | 15 | 19 | 40 | 12 | | 1.7 | |

TABLE 3

|  | Thickness of partition wall (μm) | Cell density (cells/inch²) | Open frontal area A (%) | A-axial compressive strength C (MPa) | Porosity P (%) | Y1(*1) | Y2(*2) | Average pore diameter (μm) | Thermal expansion coefficient A-axis °C.$^{-1}$ | Thermal expansion coefficient B-axis °C.$^{-1}$ |
|---|---|---|---|---|---|---|---|---|---|---|
| Example 1 | 304 | 300 | 62.8 | 1.8 | 70 | 0.53 | 0.53 | 29 | 0.7 | 1.0 |
| Example 2 | 304 | 300 | 62.8 | 2.0 | 69 | 0.61 | 0.62 | 22 | 0.8 | 1.0 |
| Example 3 | 304 | 300 | 62.8 | 2.3 | 68 | 0.78 | 0.79 | 19 | 0.5 | 0.9 |
| Example 4 | 304 | 300 | 62.8 | 3.5 | 63 | 1.14 | 1.15 | 17 | 0.4 | 0.7 |
| Example 5 | 304 | 300 | 62.8 | 3.4 | 65 | 1.42 | 1.43 | 21 | 0.6 | 0.9 |
| Example 6 | 304 | 300 | 62.8 | 3.0 | 67 | 1.34 | 1.35 | 23 | 0.5 | 0.8 |
| Example 7 | 304 | 300 | 62.8 | 4.5 | 58 | 2.98 | 2.99 | 23 | 0.5 | 0.8 |
| Example 8 | 304 | 300 | 62.8 | 3.2 | 73 | 2.22 | 2.23 | 17 | 0.4 | 0.7 |
| Example 9 | 275 | 275 | 67.3 | 3.5 | 58 | 0.96 | — | 25 | 0.5 | 0.8 |
| Example 10 | 432 | 100 | 68.9 | 2.0 | 65 | 0.86 | — | 27 | 0.6 | 0.9 |
| Example 11 | 275 | 275 | 67.3 | 2.1 | 66 | 0.90 | — | 27 | 0.7 | 1.0 |
| Comp. Ex. 1 | 304 | 300 | 62.8 | 1.8 | 65 | −0.18 | −0.17 | 26 | 0.6 | 1.1 |
| Comp. Ex. 2 | 304 | 300 | 62.8 | 2.0 | 60 | −1.07 | −1.06 | 33 | 0.7 | 1.1 |
| Comp. Ex. 3 | 304 | 300 | 62.8 | 1.6 | 62 | −0.98 | −0.96 | 29 | 0.6 | 1.0 |

(*1) $Y1 = C - (600e^{-0.014AP})$
(*2) $Y2 = C - (600e^{-0.088P})$

The results are shown in Table 3. Each of the honeycomb structures produced in Comparative Examples 1 to 3, using alumina and kaolin having particle diameters out of the range of the second aspect of the present invention, showed a low A-axial compressive strength. On the other hand, each of the honeycomb structures in Examples 1 to 11 was produced according to the second aspect of the present invention. Each of the honeycomb structures obtained showed very high A-axial compressive strength even with high porosity and/or high open frontal area, and it can be understood that the honeycomb structures have small pressure loss and hardly damaged when they are used as filters such as DPFs. In addition, since each of the honeycomb structures obtained in Examples 1 to 11 has an average pore diameter of 15 μm or more and less than 30 μm, a porosity of 55% or more, a volume ratio of 50% or more of pores having a diameter of 10 to 40 μm with respect to all pores; the honeycomb structure has excellent trapping efficiency when it is used as a filter such as DPF.

INDUSTRIAL APPLICABILITY

As described above, a honeycomb structure of the first aspect of the present invention is hardly damaged even with high porosity and high open frontal area and can suitably be used as an exhaust gas purification filter such as a DPF, a catalyst carrier, or the like. In addition, by the method for producing a honeycomb structure of the second aspect of the present invention, a honeycomb structure of the first aspect can suitably be produced. Incidentally, though the present invention has been described mainly with regard to a plugged honeycomb structure used as a DPF or the like, the present invention is to provide a honeycomb structure having higher strength with predetermined porosity and open frontal area, and it is useful regardless of presence of plugging portions or usage.

The invention claimed is:

1. A honeycomb structure comprising porous partition walls disposed so as to form a plurality of through holes extending from one end portion to the other end portion in A-axis direction, and containing cordierite as a main component; wherein, when porosity is P(%), compressive strength in the A-axis direction is C(MPa), and open frontal area is A(%), a relation of Z 1=0.5 in the following formula (1):

$$C \geq (600e^{-0.0014AP}) + Z1 \quad (1)$$

is satisfied, and
wherein the cordierite-forming raw material contains an aluminum source raw material, kaolin, talc, and silica, with the aluminum source raw material having an average particle diameter of 1 to 6 μm, kaolin having an average particle diameter of 1 to 10 μm, and talc and silica each having an average particle diameter of 10 to 60 μm.

2. A honeycomb structure according to claim 1, wherein a relation of Z 1 =1.0 in the formula (1) is satisfied.

3. A honeycomb structure according to claim 1, wherein a relation of Z 1 =1.5 in the formula (1) is satisfied.

4. A honeycomb structure according to claim 1, wherein predetermined through holes among the plurality of through holes are plugged at one of the end portions.

5. A honeycomb structure according to claim 4, wherein an average pore diameter is 15 μm or more and less than 30 μm.

6. A honeycomb structure according to claim 5, wherein a volume ratio of pores having pore diameters of 10 to 40 μm to all pores is 50 % or more.

7. A honeycomb structure according to claim 6, wherein a volume ratio of pores having pore diameters of 10 to 40 μm to all pores is 70 % or more.

8. A honeycomb structure according to claim 5, wherein a volume ratio of pores having pore diameters of 70 μm or more to all pores is 10 % or less.

9. A honeycomb structure according to claim 5, all pores is 30 % or Wherein a volume ratio of pores having pore diameters of 10 μm or less to all pores is 30 % or less.

10. A honeycomb structure according to claim 9, wherein a volume ratio of pores having pore diameters of 10 μm or less to all pores is 10 % or less.

11. A honeycomb structure according to claim 4, wherein the porosity is 55 % or more.

12. A honeycomb structure according to claim 11, wherein the porosity is 60 to 70 %.

13. A honeycomb structure according to claim 1, wherein a thermal expansion coefficient of partition walls in a longitudinal direction in a section perpendicular to the A-axis direction of the honeycomb structure is $1.0 \times 10^{-6}$/°C. or less.

14. A honeycomb structure according to claim 1, wherein the partition wall has a thickness of 290 to 310 μm, and 270 to 330 through holes are present per one square inch (6.4516 cm²) in a section perpendicular to the A-axis direction, and the P(%) and the C(MPa) satisfy a relation of Z 2=0.5 in the following formula (2):

$$C \geq (600e^{-0.088P}) + Z2 \quad (2).$$

15. A honeycomb structure according to claim 14, wherein a relation of Z 2=1.0 in the formula (2) is satisfied.

16. A honeycomb structure according to claim 14, wherein a relation of Z 2=1.5 in the formula (2) is satisfied.

17. A method for producing a honeycomb structure comprising:
- a forming step where a raw material comprising a cordierite-forming raw material, a pore-forming material, and water is kneaded and formed to obtain a honeycomb formed body having partition walls disposed so as to form a plurality of through holes extending from one end portion to the other end portion in A-axis direction, and
- a firing step where the honeycomb formed body is fired;
- wherein, when porosity is P(%), compressive strength in the A-axis direction is C(MPa), and open frontal area is A(%), a relation of Z1=0.5 in the following formula (1):

$$C \geq (600e^{-0.0014AP}) + Z1 \quad (1)$$

is satisfied, and
- wherein the cordierite-forming raw material contains an aluminum source raw material, kaolin, talc, and silica, with the aluminum source raw material having an average particle diameter of 1 to 6 μm, kaolin having an average particle diameter of 1 to 10 μm, and talc and silica each having an average particle diameter of 10 to 60 μm.

18. A method according to claim 17, wherein a honeycomb structure satisfying a relation of 1=1.0 in the formula (1) is produced.

19. A method according to claim 17, wherein a honeycomb structure satisfying a relation of 1=1.5 in the formula (1) is produced.

20. A method according to claim 17, wherein the aluminum source raw material has an average particle diameter of 1 to 4 μm, kaolin has an average particle diameter of 1 to 6 μm, and talc and silica each has an average particle diameter of 10 to 30 μm.

21. A method according to claim 17, wherein the aluminum source raw material has an average particle diameter of 1 to 2 μm, kaolin has an average particle diameter of 1 to 3 μm, and talc and silica each has an average particle diameter of 10 to 30 μm.

22. A method according to claim 17, which includes a plugging step where predetermined through holes are plugged at one of the end portions.

23. A method according to claim 17, wherein the pore-forming material contains a resin which foams by heating.

24. A method according to claim 17, wherein the pore-forming material contains a foamed resin.

25. A method according to claim 17, wherein the pore-forming material contains graphite.

26. A honeycomb structure produced by a method comprising:
- a forming step where a raw material comprising a cordierite-forming raw material, a pore-forming material, and water is kneaded and formed to obtain a honeycomb formed body having partition walls disposed so as to form a plurality of through holes extending from one end portion to the other end portion in A-axis direction, and
- a firing step where the honeycomb formed body is fired;
- wherein, when porosity is P(%). compressive strength in the A-axis direction is C(MPa), and open frontal area is A(%). a relation of Z 1=0.5 in the following formula (1):

$$C \geq (600e^{-0.0014AP}) + Z1 \quad (1)$$

is satisfied, and
- wherein the cordierite-forming raw material contains an aluminum source raw material, kaolin, talc, and silica, with the aluminum source raw material having an average particle diameter of 1 to 6 μm, kaolin having an average particle diameter of 1 to 10 μm, and talc and silica each having an average particle diameter of 10 to 60 μm.

\* \* \* \* \*